(No Model.) 2 Sheets—Sheet 1.
W. H. KNIGHT.
ELECTRIC RAILWAY.
No. 458,583. Patented Sept. 1, 1891.
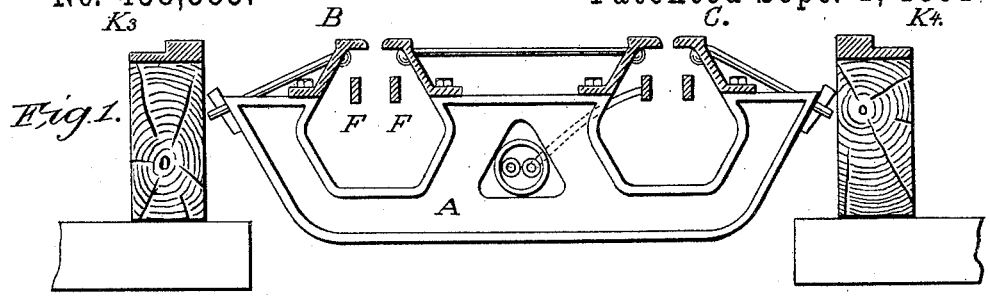
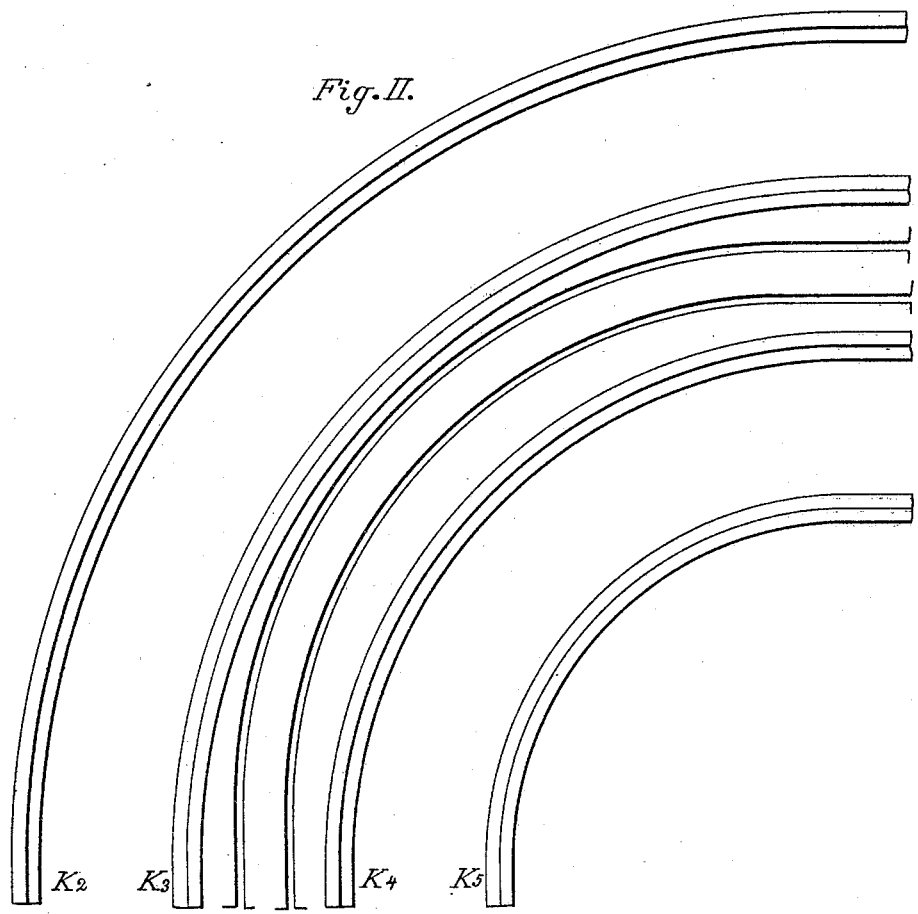
WITNESSES
Joseph E. Olee.
Edward S. McKinney.
INVENTOR
Walter H. Knight
by Bentley & Knight
Attys.

(No Model.) 2 Sheets—Sheet 2.
W. H. KNIGHT.
ELECTRIC RAILWAY.
No. 458,583. Patented Sept. 1, 1891.
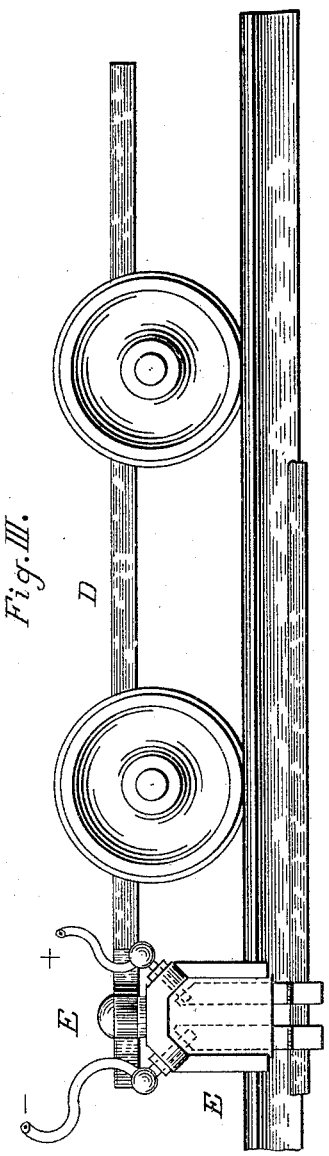
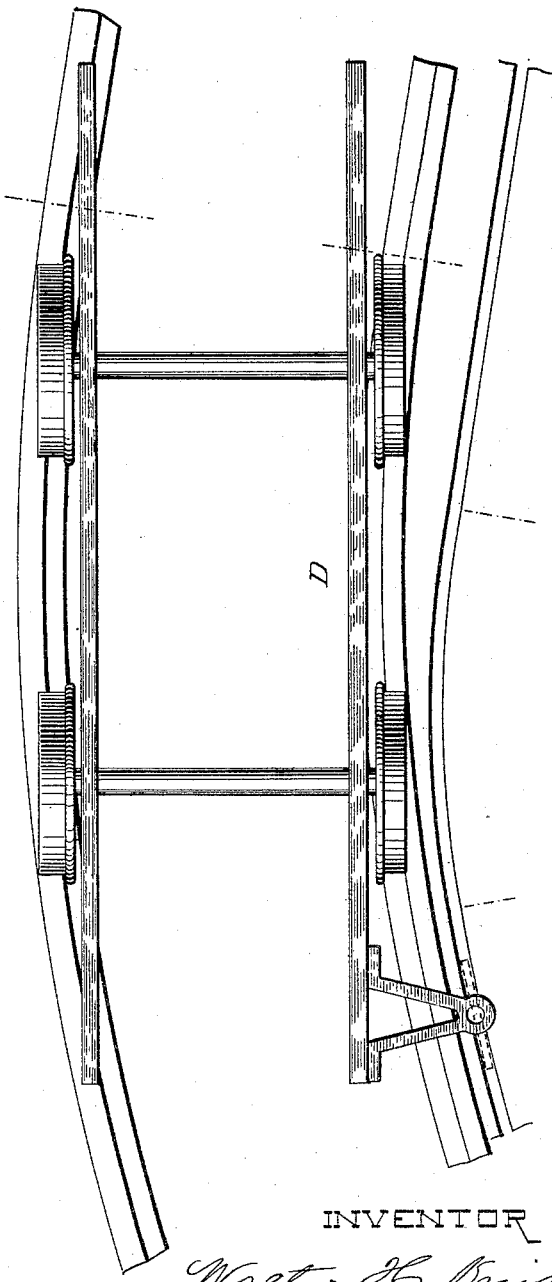
WITNESSES
Joseph E. Aue
Edward S. McKinney
INVENTOR
Walter H. Knight
by Bentley Knight
Attys.

UNITED STATES PATENT OFFICE.

WALTER H. KNIGHT, OF NEW YORK, N. Y.

ELECTRIC RAILWAY.

SPECIFICATION forming part of Letters Patent No. 458,583, dated September 1, 1891.

Original application filed March 13, 1886, Serial No. 195,133. Divided and this application filed December 5, 1888. Serial No. 292,715. (No model.)

*To all whom it may concern:*

Be it known that I, WALTER H. KNIGHT, a citizen of the United States, residing at New York city, in the county of New York, State of New York, have invented certain new and useful Improvements in Electric Railways, of which the following is a specification.

This application is a division of my application for electric railways, filed March 13, 1886, Serial No. 195,133.

My invention relates to electric railways wherein the supply conductor or conductors are inclosed in a conduit; and its object is to avoid the objections which in many instances are attendant upon a conduit placed between the track-rails, as well as to provide a suitable structure for the wires for each of two parallel roads. To accomplish this desired result, I place the conduit outside the rail, and when equipping a double-track road I construct a conduit for the conductors of both roads and place it between the two tracks, so as to be readily accessible for the collecting devices carried by the cars on the two roads. It is of course also necessary that the plow or collector should be so modeled and arranged as to be adapted for use under the above conditions.

My invention therefore consists in the location of the conduit with reference to the running-rails and to various features in the construction of the conduit and collecting-plow, as described and claimed hereinafter.

My invention is illustrated in the accompanying drawings, wherein—

Figure 1 is a cross-sectional view of the double conduit placed between the inner rails of a double-track road. Fig. 2 is a plan of the same at a curve. Fig. 3 is a side view of a truck and plow adapted for use in the system. Fig. 4 is a plan view of the same.

In Fig. 1, $K^3$ and $K^4$ are the inner rails of a double-track road, which are laid upon the usual longitudinal sleepers and cross-ties.

A represents my improved double outside conduit, which consists of a common supporting-yoke and two separate sets of slot irons or rails B and C, having upwardly and inwardly inclined webs, thereby forming in reality two conduits having a common yoke. The slot-rails are bolted to the yoke and are braced by tie-rods, one extending from each of two outer slot-rails to the yoke and a third connecting the two inner slot-rails.

In outside conduits as heretofore constructed the conduit has been placed immediately at one side of the track-rail, and this rail has been relied upon to form one side of the slot. In this construction it is noticeable that the slot is formed by rails independent of the track-rails. In each of the conduits thus formed I support by any suitable means supply-conductors F F, which are protected by the overhanging portions of the slot-rails.

As shown in Fig. 1, the yoke has an opening in its lower part, and in this can be placed underground conductors, which may be used as feeding-conductors connected to the supply-conductors at intervals, or for any other desired purpose.

In Figs. 3 and 4 there is shown a car-truck D of any desired construction and a plow E, supported above the slot of the outer conduit from a bracket which projects laterally from the inner side of the truck. The plow is journaled to the bracket upon a vertical pivot, and hence is free to rotate, so as to preserve contact with the conductor at curves and where there are irregularities in the line. When the car is on a curve, there will be no difficulty in keeping the plow in contact with the conductors if it is supported directly upon one of the axles of the truck or in line therewith; but when placed outside of the axle-lines the curve described by the plow in its movement would not be concentric with that of the axis of the track, and some special means must be provided to obviate this difficulty. For this reason slot-rails at curves are laid eccentric to the track-rails. Suppose the car, Figs. 2 and 4, be upon the rails $K^2 K^3$. The slot will then be on the inside of the curve, and it will be seen that the plow will tend to draw in toward the track-rail, and hence the slot is brought nearer thereto. If, however, the car be upon the track $K^4 K^5$, the slot will be upon the outside of the curve and the plow will tend to draw away from the track, and hence the slot likewise must curve outward. By the construction herein set forth it will be seen that the vertical axis around which the plow swivels has a lateral movement relatively to the rails in one direction when the car passes the curve on one track and in the opposite direction when on the other track. The axis therefore constantly keeps in line with the slot and the plow rounds the curves without binding or wrenching.

There are a number of important advantages in placing both conduits between the two tracks. The conduit can be laid more easily and cheaply, because all the excavating is done at one point, and for the same reason traffic is not so much interrupted by the breaking up of the streets. Then, too, the conduits when laid are in that part of the street where they are least exposed to the wear and tear of passing wagons. In winter they can be more easily cleared of snow, and when they are flushed the same catch-basins or sewer-openings can be used. This arrangement also brings the projecting plows on the inside of each car, where there is less danger of their being struck and broken. Figs. 1 and 2 show that the two conduits are so located with respect to the two tracks that the conduit-slots are at substantially the same distance from the inner track-rails. The conductors for the two conduits are also of the same size and pattern and are correspondingly arranged in each. It is therefore possible for the car (shown in Fig. 4) to run on either track, its direction of movement being reversed.

The slot-iron independent of the track-rail is another important feature in my invention, because the track-rails when worn out can be replaced without interfering with the conduit and because the travel upon the track-rails wears and spreads them to such an extent that it is impossible to preserve the width of the slot-opening uniform when the track-rail is made to form one edge of the slot. In any case a transverse bracing is necessary to prevent the spread of the track closing the slot.

What I claim as new, and desire to secure by Letters Patent, is—

1. The combination, in an electric railway, of a slotted conduit inclosing the supply-conductor and normally parallel with the railway-track, but eccentric thereto at a curve, with a contact device connected to a vehicle on the railway at a point at one side of the axle of the truck and having a movement relative to the vehicle about a vertical axis.

2. The combination, with the direct and return tracks of an electric railway, of two conduits for the said tracks, respectively located adjacent to each other in the space between the tracks, a supply-conductor in each conduit, an electrically-propelled vehicle designed to run over both tracks, an inside current-collector beyond the track-rails, drawn along by the vehicle in engagement with the supply-conductor, and a connection between the vehicle and collector permitting movement of the latter relatively to the former to compensate for irregularities in the conduit, substantially as set forth.

3. The combination, in an electric railway, of two curving tracks, two intermediate curved conduits provided with supply-conductors for the two tracks, respectively, an electrically-propelled vehicle provided with a side plow or collector adapted to the outside conduits, and means for permitting opposite lateral movement of the vehicle-axis relatively to the two tracks, respectively, without interference with the curved conduits.

4. A double conduit consisting of the common supporting-yoke forming the lower part of the conduits and the two separate sets of slot-rails which are fixed upon and extend upward from the yoke to form the upper part of the conduits.

5. A double conduit consisting of the common supporting-yoke, the two separate sets of slot-irons carried thereby, and the braces for the slot-irons, substantially as described.

6. The combination, with the direct and return tracks of an electric railway, of conduits for the said tracks, respectively, both placed between the tracks, separate sets of rails or slot-irons for each of the conduits, and supply-conductors in the conduits, substantially as set forth.

7. The combination, with the direct and return tracks of an electric railway, of conduits for the said tracks, respectively, both placed between the two tracks, slot-rails for the conduits having upwardly and inwardly inclined webs, and supply-conductors in the conduits located to one side of the slots, whereby they are protected by the overhanging portions of the rails.

8. The combination, in an electric railway, of two conduits placed between the tracks of a double-track railway having separate sets of slot-rails, and a brace between the two inner slot-rails, with supply-conductors in the conduits, as set forth.

9. The combination, with the direct and return tracks of an electric railway, of conduits for the said tracks, respectively, both placed between the tracks, supply-conductors in the conduits, an electrically-propelled vehicle, and an inside current-collector jointed to the vehicle on a vertical axis, as set forth.

10. The combination, in an electric railway, of a traveling truck and a contact device supported thereby at a point outside of the axle-line with a conductor parallel to the track upon the straight portions of the line, but at curves following a line eccentric thereto corresponding to the path of movement of the current-collector.

11. The combination of a double-track railway with two outside conduits having a common yoke and an intermediate conduit inclosing electric conductors.

12. The combination, in an electric railway, of the two tracks thereof, two intermediate slotted conduits, each inclosing a supply-conductor adapted to a traveling contact device, and a conduit between the two slotted conduits inclosing insulated conductors connected to the said supply-conductors.

13. The combination of the common supporting-yoke for two outside conduits and an intermediate conduit extending through said yoke and supported thereby.

WALTER H. KNIGHT.

Witnesses:
JOHN P. S. CHURCHILL,
CALEB H. SWAN.